United States Patent [19]

Starr

[11] Patent Number: 4,484,698

[45] Date of Patent: Nov. 27, 1984

[54] ULTRA MICRO PRECISION FLUID METERING DEVICE

[75] Inventor: Maurice Starr, Indianapolis, Ind.

[73] Assignee: American Monitor Corporation, Indianapolis, Ind.

[21] Appl. No.: 304,384

[22] Filed: Sep. 22, 1981

[51] Int. Cl.³ .......................... B67D 5/60; B65D 37/00
[52] U.S. Cl. ...................................... 222/131; 222/14; 222/209; 222/213; 222/214; 73/736
[58] Field of Search ............... 222/148, 209, 213, 214, 222/406, 71, 282, 283, 309, 14, 15, 16, 17, 18, 19, 20, 21, 22, 212, 215, 206, 131; 73/732, 736, 737, 741, 864.11, 864.12, 864.16

[56] References Cited

U.S. PATENT DOCUMENTS 3,197,285  7/1965  Rosen ................................ 73/864.12
3,990,313  11/1976  Björklund et al. .................. 73/425.6

FOREIGN PATENT DOCUMENTS

2316481  10/1973  Fed. Rep. of Germany ...... 222/214

Primary Examiner—Joseph J. Rolla
Assistant Examiner—Michael S. Huppert
Attorney, Agent, or Firm—Robert A. Spray; Marilyn L. Amick

[57] ABSTRACT

A precision metering device for very small quantities of fluids, in which a controlled deflection of one or more selected portions of a Bourdon tube are used to give precise metering of fluids in amounts of only a few microliters or less, and in which a single one of the precision metering devices may be used to provide selected variations of the small amounts of dispensed fluid and with different fluids, usually without extra purging procedures.

11 Claims, 10 Drawing Figures

ULTRA MICRO PRECISION FLUID METERING DEVICE

BACKGROUND OF THE INVENTION

The present invention relates to metering devices for fluids; and more particularly it relates to a device which achieves highly precise metering of extremely small quantities of fluids such as that in the range of only a very few microliters or less, thereby providing special advantages and utility in the field of chemical assays of biological specimens in which precise control is very desirable as to the small amount of reagents, serum sample, or other fluids used in the assay.

It is well known that a major determinative factor regarding the amount of a biological specimen required to be used in an assay is imposed by the limitations in accuracy and precision of the measuring or metering means available to the laboratory worker; and for a long time a high degree of accuracy and precision has been particularly difficult to attain when there are only very small quantities of specimen available for the assay, such as spinal fluid specimens and blood specimens from pediatric or geriatric patients. Thus the more precise a metering means can be with respect to smallness of amount of quantities metered, the less the amount of the biological sample need be provided to the assayist or to the assay equipment. And since biological fluids, particularly blood for example, are usually difficult to obtain in large quantities (due to expense, pain, and other undesirable factors), a precision metering of very small quantities of assay fluids has been long a goal in the field of such chemical assays.

Also a minimization of sample volume, and thus also of reagent volumes, has been increasingly felt desirable as to such factors as reduction of space requirements of assay equipment and reduction in costs of the reagents themselves.

Thus, for reasons as those illustrated, a goal and achievement of the present invention is to provide high precision metering of extremely small (a microliter or less) quantities of fluids.

Further, the concepts of the present invention achieve a long-lasting durability and reliability of the equipment, thus achieving and providing long-term dependability, which is particularly advantageous in the field of bio-chemical assays whose accuracy and reliability is needed for human health and welfare, considering the diagnostic and therapeutic medical values and uses of such assays.

(In using the terms herein such as "precise", "accurate", etc., they are used in the sense of repeatability from one test to the next, in contrast to numerical exactness; although, even as to numerical exactness, that also may be generally achieved by adjustment and calibrations as herein mentioned.)

SUMMARY OF THE INVENTION

In carrying out the invention in a preferred embodiment, a Bourdon tube device having a tube of non-circular cross-section is utilized with the interior providing a displacement or metering chamber, and its walls providing stiff yet movable diaphragm portions; and the walls of the Bourdon tube device are caused to flex inwardly by exteriorly-applied force or pressure, in a controlled manner, and to thus change the cross-sectional shape of the Bourdon tube device, to achieve a precise and controlled displacement or metering effect as to extremely small increments of liquid.

PRIOR ART USES AND DEVELOPMENT OF BOURDON TUBE COMPONENTS

Bourdon tube devices have been long known. Their uses have been as various types of pressure-responsive means, such as a pressure gauge, in which the interior of the Bourdon tube is caused to be in communication with a pressure source to be measured or perhaps otherwise used, and the Bourdon tube element being in some sort of a spiral or other curve, the Bourdon tube element responding to the pressure differential by deflecting, thus achieving some mechanical effect which is used or measured.

As described introductorily in *Measurement Systems Application and Design*, Ernest O. Doebelin (McGraw Hill, 1966), p. 382 and 383, "The gross deflection of these elements may directly actuate a pointer/scale readout through suitable linkages or gears, or the motion may be transduced to an electrical signal by one means or another. Strain gages bonded to diaphragms are also widely used to measure local strains that are directly related to pressure. . . . The Bourdon tube is the basis of many mechanical pressure gages and is also widely used in electrical transducers by measuring the output displacement with potentiometers, differential transformers, etc. The basic element in all the various forms is a tube of noncircular cross section. A pressure difference between the inside and outside of the tube (higher pressure inside) causes the tube to attempt to attain a circular cross-section. This results in distortions which lead to a curvilinear translation of the free end in the C type and spiral and helical types and an angular rotation in the twisted type, which motions are the output. The theoretical analysis of these effects is difficult, and practical design at present still makes use of considerable empirical data."

And as described by a manufacturer of Bourdon tubing, it is used by leading gauge manufacturers "because of its accuracy, sensitivity, and consistency. Precise wall thickness, repetitively consistent spring properties, and uniform dimensional accuracy all combine to insure absolutely dependable performance. . . . Heat treatment under electronic control results in precise grain size and uniform temper for excellent spring properties. Controlled furnace atmosphere produces tubing that is free from scales or oxides. . . . Close control of every step in manufacture, including drawing, heat treating, cutting, finishing and packaging, insures tubing that meets the most exacting specifications. . . . Flat oval, ellipse, and D-shaped tubing meet most requirements. However, other special shapes can be supplied if desired." (From product brochure of Precision Tube Company, Inc., North Wales, Pa. 19454.)

Accordingly, it will be seen that Bourdon tubing is not only a long-known component, it is a component which has received considerable development and attention by industry, and it has long been available.

Thus a special and particular achievement of the present invention has been to utilize this long-known industrial element or component in this novel and highly advantageous use, quite different from a use in which interiorly-applied pressure is utilized in achieving its mechanical deflection as a shape-changeable component; and, quite in contrast thereto, the present inventive concepts provide that it is used in a preferred embodiment by exteriorly-applied pressure or force in achieving a deflection of a portion of its wall to achieve a pumping or metering action interiorly, as to extremely small increments of the liquid.

The precision achieved, as to even such a small volume as one or a few microliters, or even a fraction of one microliter, seems to be so good that currently available measuring devices are not able to detect any error at all, as to exact repeatability from one assay to the next.

Some prior art, discovered after this invention was made, is the U.S. Pat. No. 4,140,020, issued Feb. 20, 1979, to R. D. Cook. That patent shows a use of tubing in a device which is described as achieving a pipette-type actuation by a bending of a tube about an axis normal or perpendicular to the plane in which the tube lies. The flexing of that length of tubing is described as changing the cross-sectional area of the tubing, and correspondingly changing the internal volume of the tubing, thereby changing pressure in the tubing and thus achieving a pumping effect. The patent does not appear to use the term "Bourdon tube", although it is shown as using tubing non-circular in cross-section.

That type of tubing-flexure, however, is quite distinct from the present invention, in which the change of cross-sectional shape of the tubing is achieved by the controlled application of force or pressure against the tubing wall, and it is further different in that the Cook-type of tubing-flexing inherently requires a rather large and bulky curving tube, with a significantly large radius of curvature, to avoid a need for too high a tube-bending moment or force.

Another device discovered after this invention was made seems not to be a reference applicable to the present invention because of that device's late date in view of the U.S. patent law (35 U.S.C. 102) and also because of differences in concept. That device is shown in the European Patent Office Application of Bunce, Gibbons, and Kricka, No. 80303704.3, filed Oct. 20, 1980 and mentioning a claim of priority as to an application of Great Britain, No. 7937750 filed Oct. 31, 1979.

The Bunce et al. device of the E.P.O. application is provided as a thick-walled compressible or "squashed" tube, said to be preferably of latex rubber, apparently of circular cross-section. Pressure applied exteriorly of the tubing compresses it in a circumferential direction, purposefully maintaining its same (annular) shape when exterior pressure is applied, and with the tubing expressly asserted to be not flattened, which non-flattening is said by the text to be necessary. This is quite distinctly different from the device of the present invention, which utilizes advantageously a Bourdon tube of non-circular cross-section, and which does flatten or inwardly deflect the walls due to the external force or pressure, and whose compression actuation is quite different from the "necessary" circumferential and non-flattening actuation of the Bunce et al. device.

Also, similar to the text of the Cook patent, this E.P.O. application does not mention any element being a Bourdon tube; and the non-flattening and circumferential compression which is said to be necessary in the E.P.O. application indicates that it is perhaps further removed from the present invention than is the Cook device.

These two cited devices also lack control and volume-variation options provided by the present invention.

BRIEF DESCRIPTION OF THE DRAWINGS

The above is of somewhat introductory and generalized form, indicating somewhat generally the inventive concepts of the novel utilization achieved of pumping and metering effects of Bourdon tubes in providing a precise microliter size quantity of fluid. More particular details, features, and concepts are set forth in the following and more detailed description of illustrative embodiments, taken in conjunction with the accompanying drawings, in which:

FIGS. 3-8 are sequential views, partly in longitudinal cross-section, illustrative of the fluid-adding system, all showing in enlarged scale the dispenser outlet tip of the device of FIG. 1; and more particularly.

DESCRIPTION OF THE PREFERRED EMBODIMENTS

As shown in the drawings, the inventive concepts utilize advantageously the characteristics and form of a component which has been long known but which, in this new setting and combination, provides a significantly new and beneficial function.

Figures 1, 2, 9:
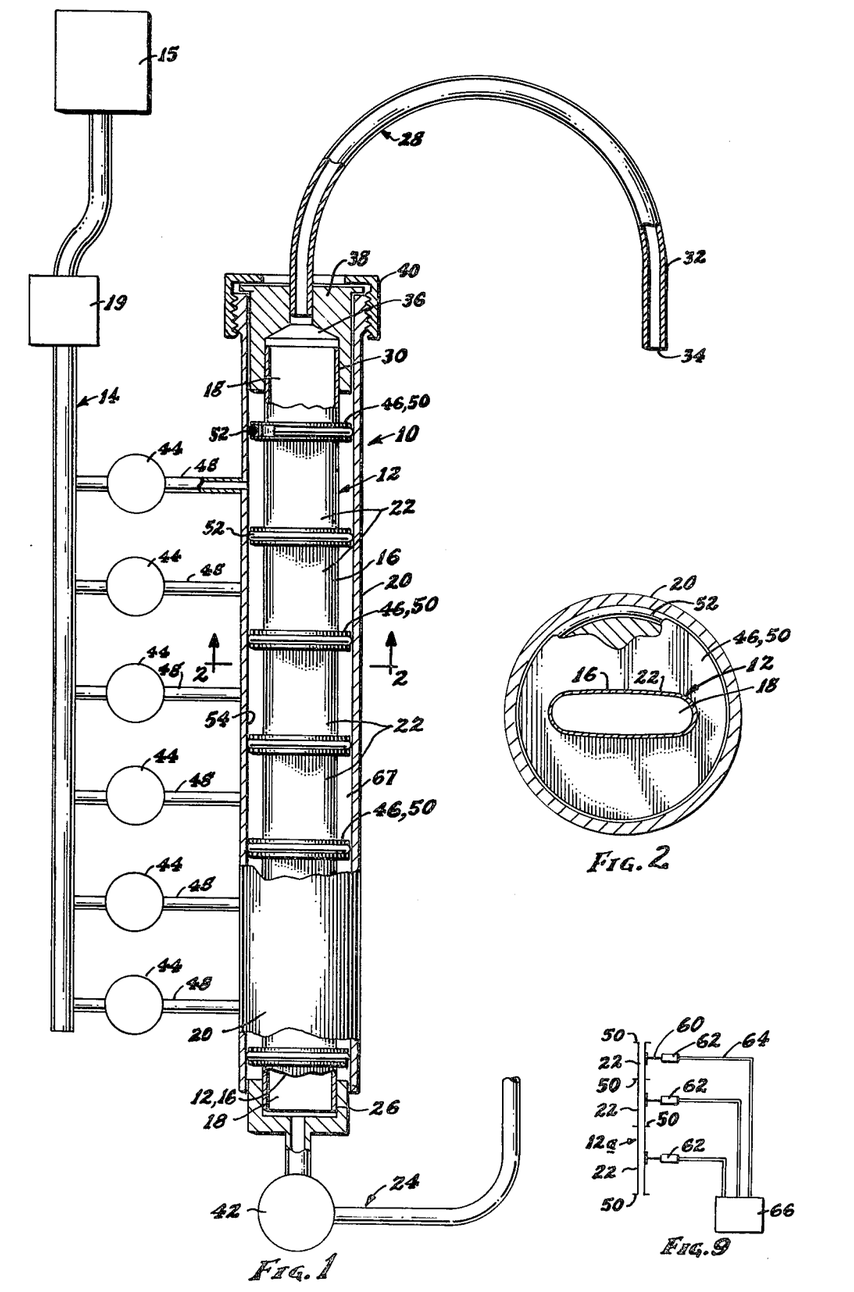
FIG. 1 is an elevational view, partly in vertical or longitudinal cross-section, of a precision metering device according to one embodiment illustrative of the inventive concepts.
FIG. 2 is a transverse cross-sectional view, in enlarged scale, generally as taken as indicated by Section-line 2—2 of FIG. 1.
FIG. 9 is a schematic illustration of a Bourdon tube unit of another embodiment, in which the Bourdon tube has different length wall-portions, and has electro-mechanical force actuators.
Figure 3:
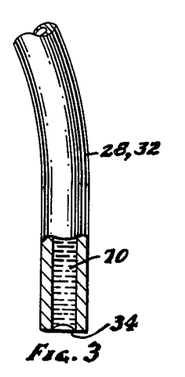
FIG. 3 shows the outlet tip, full of a diluent.

More particularly, according to the present concepts, there is provided in a first illustrative embodiment shown in the drawings a precision fluid metering device 10 having a novel combination of the long known component known as a Bourdon tube 12, but with pressure means 14 for exerting regulated pressure (as shown from an air compressor 15) to the exterior surface 16 of the Bourdon tube 12, quite in contrast to the supplying of pressure to the interior 18 of the Bourdon tube 12 as in use of a Bourdon tube in a positive pressure gauge.

Precision pressure control is very desirable for many or most uses, and thus the drawings show a precision pressure regulator 19 in the line 14.

There are provided enclosure means 20 which enclose segments or portions 22 of the Bourdon tube 12; but the enclosure means permits pressure from the pressure means 14 to be operatively exerted exteriorly to the Bourdon tube 12 as mentioned above, achieving an inward deflection or flattening of the wall segments or portions 22 of the Bourdon tube 12.

As shown, fluid input means 24 communicate with the interior 18 of the Bourdon tube device 12 adjacent the upstream end 26 thereof, that is, the lower end in FIG. 1; and, as shown at the upper end of the Bourdon tube 12 in FIG. 1, there are fluid discharge means 28 which communicate with the interior 18 of the Bourdon tube means 12 adjacent the downstream end 30 thereof.

The discharge means 28 is shown in this embodiment as a curved outlet tube 32 having an open outlet tip 34; and, at its upstream end, the outlet tube 32 is affixed to a transition element 38 which is affixed to the downstream end 30 of the Bourdon tube 12 and supported and held in place by a body member 38 held by a cap 40 screwed to the enclosure 20.

A control means 42, here shown diagramatically as a valve, is operatively associated with the fluid input means 24; and it is operative in one setting to permit flow of fluid through it and through the Bourdon tube 12 in only the direction from upstream to downstream. Other actuation of the valve 42 is described below.

Control means 44 are provided, by which actuation of the pressure means 14 exerts pressure to the exterior surface 16 of the Bourdon tube means 12 to effect a change of shape of the tube wall portions 22, which causes an increment of fluid to move to discharge through the fluid discharge means, also as more specifically set forth below.

Blocking means 46 are shown as provided, which extend between the Bourdon tube means 12 and the enclosure means 20; and the blocking means 46 prevent pressure exerted by the pressure means 14 to be exerted onto more than a selected portion or portions 22 of the Bourdon tube means 12, for achieving the optional selectivity of pumping actuation as to the particular amount desired.

More particularly, the control means 44 (here shown as a control in each of the pressure lines 48 which respectively communicate exteriorly with each of the Bourdon tube wall portions 22 separated by the blocking or separator walls 46) is operative, optionally at the will of the user, to exert pressure exteriorly to the wall 16 of the Bourdon tube means 12 at a selected one or plurality of the wall portions 22 thereof and thereby achieve a selected variation in the amount of the increment of fluid caused to move to discharge through the fluid discharge means.

That variation of fluid increment is dependent upon which one or more segments of wall portions 22 of the Bourdon tube means 12 are caused to have pressure exerted thereupon by the pressure means 14, that pressure being controlled by controls 44.

Desired variations of fluid increments dispensed may also be achieved by controlled changes of pressure, as controlled by the pressure regulator 19 or by a pressure regulating nature of valves 44 in lines 48, to achieve variation in pumping operativity of the various wall portions 22.

Support means 50 are shown as incorporated into the blocking means 46, providing support of the Bourdon tube means 12 in a manner such that the pressure exerted to the Bourdon tube means 12 between any two adjacent ones of the blocking means 46 will cause a change of shape of the Bourdon tube wall 16 substantially only in the portion between those particular blocking means 46.

Further, the supports 50 support the Bourdon tube means 12 between adjacent blocking means 46 in a manner which provides that the Bourdon tube means 12 in the specifically pressurized wall portion 22 is in the nature of a diaphragm fixed at both ends; and this permits relatively low inward deformation of the Bourdon tube means 12 per unit of pressure exerted by the pressure means 14 and thus gives repeatedly a high control and precision as to very small amount of fluid discharged with respect to the amount of pressure means 14.

Economy of parts and of space is enhanced, as shown, by providing that the support means 50 and blocking means 46, at the effective end of each Bourdon tube wall unit 22, are provided as a unitary wall component extending between the Bourdon tube means and the enclosure means. As shown, each wall unit 46, 50 carries an O-ring 52 which sealingly engages the inner wall 54 of the enclosure 20.

Further optional variations in the size of the metered liquid are provided by causing the walls 50 to be provided (FIG. 9) at varying spacings along the Bourdon tube means 12, thereby providing some differences in the length of various segments or wall portions 22, and thus achieving a variation in the amount of fluid displaced, depending upon which one or more sections or wall portions 22 of the Bourdon tube means 12 is the one or ones onto which pressure is exerted from the pressure means 14.

Other variations in the nature of the Bourdon tube, and in the means by which its wall portions are caused to deflect inwardly in order to achieve its precision pumping effect, may be used.

For example, FIG. 9 illustrates a grouping of mechanical deflection-causing shafts 60, powered by solenoids 62 whose circuits 64 are controlled by a control unit 66, as alternatives to the pneumatic actuation of each of the tubes or pressure lines 48 with their controls 44 of FIG. 1.

Further, the device may be used by applying the pressure interiorly of the tube 12, achieving an outward displacement of the tube wall 16, and thus providing a pumping or fluid displacement effect exteriorly of the tube 12, that is, between tube wall 16 and the inner wall 54 of the enclosure 20.

Figure 10:
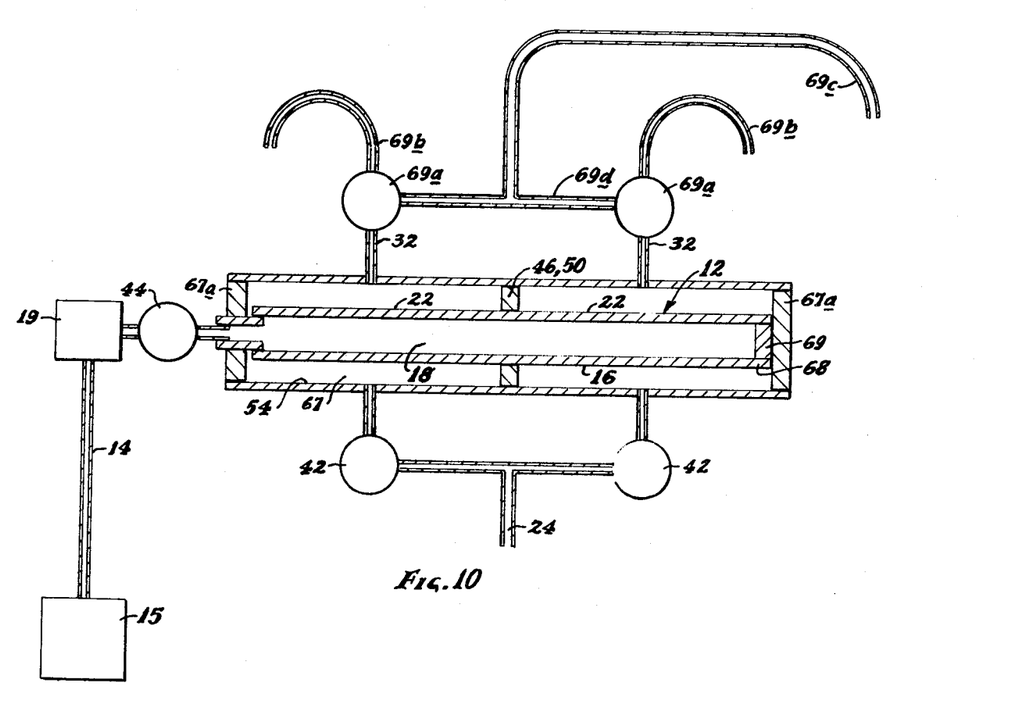
FIG. 10 is a schematic view illustrating the use of a Bourdon tube unit with pressure applied to the interior of the Bourdon tube and with the carrier fluid to be displaced being exterior of the Bourdon tube.

This embodiment of a Bourdon tube device is schematically illustrated in FIG. 10. As there illustrated, the actuating medium (e.g. compressed air) from a pressurized supply or compressor 15 is caused to flow through line 14 to emerge at controlled pressure from a pressure regulator 19, through a control means or valve 44, to the interior 18 of the Bourdon tube means 12, there to press outwardly against the tube wall portions or segments 22.

Further, as shown in FIG. 10, it is there shown that the carrier fluid is exterior of the Bourdon tube 12, in contrast to being interior thereof as in the embodiment of FIG. 1; and the inlet control means (shown as valve or valves 42) are shown leading from a fluid supply line 24 to the exterior of the Bourdon tube 12, i.e., the annular chamber 67 (shown closed at each end by closures 67a) between the outer wall 16 of the Bourdon tube 12 and the inner wall 54 of the enclosure 20.

The end 68 of the Bourdon tube is shown closed by a seal or plug 69; and blocking means 46 and support means 50 are shown along a central portion of the Bourdon tube 12.

Thus, contrasting the FIG. 10 embodiment with that of FIG. 1, in the FIG. 10 embodiment the carrier fluid from supply line 24 is caused to be present in the annular chamber 67, and it is caused to be displaced outwardly through a discharge means shown as outlets 32 respectively communicating with, and leading from, chamber segments or portions 22 exteriorly of the Bourdon tube 12.

In FIG. 10, the outlets 32 are shown as provided with control means or valves 69a leading to outlet tubes 69b; and the outlets 69b, or the common outlet 69c which leads from a manifold 69d which interconnects the several outlets 32 (depending upon the setting of the outlet valves 69a), correspond to the outlet tip 34 of the embodiment of FIG. 1.

Further as to the FIG. 10 embodiment, it will be understood that the carrier fluid in chamber 67 is displaced by pressurizing the interior of the Bourdon tube 12; and that displacement of the carrier fluid is used in a metering function as to associated fluid to be metered, as now described in a typical use of either embodiment.

In using the precision pumping devices, an advantageous procedure and technique is illustrated in FIGS. 3-8. As there illustrated, an advantageous system of a reagent-adding procedure is sequentially shown, first (FIG. 3) by forcing a carrier or diluent liquid (water 70) to or out the dispensing outlet 34. In doing this the Bourdon tube device 12 is in a compressed state. The valve 42 for the water, diluent, or other fluid, in such procedure is in a fully blocked position such that diluent cannot enter from upstream when the pressure on the Bourdon tube 12 is subsequently released.

Figure 4:
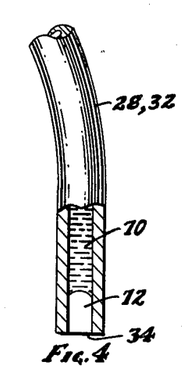
FIG. 4 shows the same, but with the diluent having been drawn up into the outlet conduit, leaving a small region of air at the outer end of the outlet tip.

Upon a release of pressure to one segment 22 of the Bourdon tube (such as by one of the control valves 44 having moved to a vent condition) the diluent in the discharge tube 32 is drawn a small amount backwardly from the outlet 34, as illustrated in FIG. 4; and this leaves at the outlet tip 34 a small region 72 of just air. Another one or more of the control valves 44 are still in a position exerting pressure in one or more of the lines 48 to the Bourdon tube's respective sections or wall portions 22.

Figure 5:
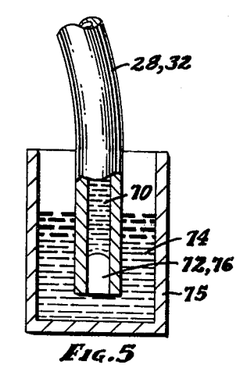
FIG. 5 shows the outlet tip, in the condition shown in FIG. 4, but now immersed into a reservoir of liquid.

Then the outlet tip 34 is immersed into the liquid to be metered, that is, the liquid 74 in a container 75 (FIG. 5).

Figures 6, 8:
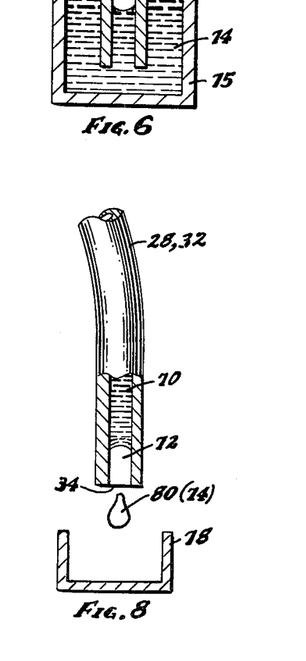
FIG. 6 shows the same but after the pumping action of the Bourdon tube has now been used to draw into the outlet conduit both the small region or bubble of air and a metered quantity of liquid, but with the air bubble serving as an interface barring mixing of the liquid and the diluent.
FIG. 8 shows the outlet tip in the process of displacement action of the Bourdon tube finally dispensing the metered quantity of liquid into whatever reaction vessel the liquid is to be dispensed.
Figure 7:
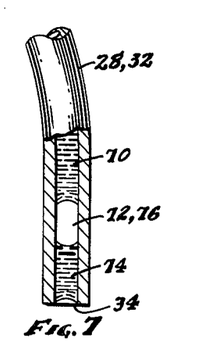
FIG. 7 shows the dispenser outlet tip removed from the liquid reservoir.

Now the other control valve (or valves) 44 (which had still been holding its line 48 pressurized) is caused to move to vent position; and this (FIG. 6) draws the liquid 70 in outlet tube 32 farther backwardly than in the position of FIGS. 4 and 5; but it also draws a precise quantity of the liquid 74 up into the outlet 32 but with the air region 72 providing a separator bubble 76 between the water 70 and the liquid 74 (FIG. 7).

Then the outlet 32 is moved to the location of dispensing as indicated by container 78 (FIG. 8); and the pumping or displacement effect of the Bourdon tube 12 is again used to dispense the small amount of the liquid 74, but now illustrated by the droplet 80, which had been drawn up into the dispensing outlet tube 32.

Then the water inlet or diluent valve 42 is actuated to let carrier water flow through the element 12 and outlet 32, purging the outlet 32 of its metered amount of reagent; and the water inlet valve 42 is then closed. If desired, further purging may be achieved by actuating the valve 42 to admit additional purging liquid into and through the element 12 and outlet portion 32, preferably with the outlet 34 directed to a waste receptacle.

The parts are now ready for the next metering operativity by a repetition of the above procedure.

As indicated above, close exactness of metered volume is achieved, although the fixed-diaphragm nature of the sections or wall portions 22, together with the extremely small volumes being used, and the above stated recognition of the need to use empirical design data, are factors which make it not fully predictable as to the precise amount of metered liquid volume which will be obtained from supposedly identical devices. However, absolute exactness is not usually considered necessary in contrast to repeatability from one test or assay to the next. If more numerical accuracy is desired, adjustments of pressure and/or calibrations could be made such as to the operativity of the control valves 44, pressure setting, or to the length of stroke of the plunger shafts 60.

The plural-segment nature of the Bourdon tube 12, and the control by pressure control of valves 44 and by the stroke of solenoid shafts 60, provide the further advantage of the device being controllable by automated means, being readily programmable by microprocessors.

It is thus seen that a precision metering device utilizing a Bourdon tube as a pumping or metering mechanism or component, according to these inventive concepts, provides a desired and advantageous device, particularly in its utility in providing microliter-range quantities of liquid in chemical assays, yielding the high desirability and advantage of close accuracy even of such very small volumes.

Accordingly, it will thus be seen from the foregoing description of the invention according to these illustrative embodiments, considered with the accompanying drawings, that the present invention provides new and useful concepts of a novel and advantageous precision metering device yielding desired advantages and characteristics particularly for assays using very small quantities of liquid such as serum samples, reagents, etc., for manual, automated or semi-automated procedures, and accomplishing the intended objects, including those hereinbefore pointed out and others which are inherent in the invention.

Modifications and variations may be effected without departing from the scope of the novel concepts of the invention; accordingly, the invention is not limited to the specific embodiments or form or arrangement of parts herein described or shown.

What is claimed is:

1. A precision fluid metering device, comprising, in combination:
   a Bourdon tube means, comprising a tube formed of elastic material and of non-circular cross-section;
   pressure means for exerting pressure to the exterior surface of the Bourdon tube means in the span of the enclosure means set forth below, and operative to cause a flattening or inward deflection of wall portions of the Bourdon tube means in said span;
   enclosure means enclosing portions of the Bourdon tube means but permitting pressure from the pressure means to be operatively exerted exteriorly to the Bourdon tube means; and control means by which actuation of the pressure means exerts pressure to the exterior surface of the Bourdon tube means to effect a flattening or inward deflection of the Bourdon tube walls and thus also effect a change of volume of the Bourdon tube interior which causes an increment of fluid to be displaced;

in a combination in which blocking means are provided which extend between the Bourdon tube means and the enclosure means and prevent pressure exerted by the pressure means to be exerted onto more than a selected portion or portions of the Bourdon tube means;

and in which the control means is operative, optionally at the will of the user, to exert pressure to the bourdon tube means at a selected one or plurality of portions thereof and thereby achieve a selected variation in the amount of fluid displaced, the variation of fluid volume displaced being dependent upon which one or more portions of the Bourdon tube means are caused to have pressure exerted thereupon by the pressure means.

2. The invention as set forth in claim 1 in a combination in which there are provided support means which support the Bourdon tube means in a manner such that
   (a) pressure exerted to the Bourdon tube means between any two adjacent ones of the blocking means will cause a change of shape of the Bourdon tube means substantially only in the portion between those particular blocking means, and
   (b) the support of the Bourdon tube means between adjacent blocking means provides that the Bourdon tube means in such portion is in the nature of a diaphragm fixed at both ends, and thus permitting a relatively limited flattening or inward deformation of the Bourdon tube means per unit of pressure exerted by the pressure means and thus giving a high control and precision as to very small amounts of fluid displaced.

3. The invention as set forth in claim 2 in a combination in which the support means and blocking means are provided as a unitary component extending between the Bourdon tube means and the enclosure means.

4. The invention as set forth in either of claims 2 or 3 in a combination in which the support means are provided at varying spacings along the Bourdon tube means, thereby achieving a variation in the amount of fluid displaced depending upon which portion or portions of the Bourdon tube means is/are the one(s) onto which pressure is exerted.

5. A precision metering device, comprising, in combination:
   a Bourdon tube means, comprising a tube formed of elastic material and of non-circular cross-section;
   force means for exerting force to the exterior surface of the Bourdon tube means; and
   control means by which actuation of the force means exerts force to the exterior surface of the Bourdon tube means to effect a change of volume thereof which causes an increment of fluid to be displaced;
   in a combination in which there are provided a plurality of support means which support the Bourdon tube means in a manner such that
   (a) force exerted to the Bourdon tube means between any two adjacent ones of the support means will cause a change of shape of the Bourdon tube means substantially only in the portion between those particular support means, and
   (b) the support of the Bourdon tube means in such portion is in the nature of a diaphragm fixed at both ends, and thus permitting a relatively limited flattening or inward deformation of the Bourdon tube means per unit of force exerted by the force means and thus giving a high control and precision as to very small amounts of fluid displaced.

6. The invention as set forth in claim 5 in a combination in which the support means are provided at varying spacings along the Bourdon tube means, thereby achieving a variation in the amount of fluid displaced depending upon which portion or portions of the Bourdon tube means is/are the one(s) onto which force is exerted.

7. A method of metering and supplying a metered amount of liquid, utilizing a Bourdon tube to achieve controlled displacement of a carrier fluid in a conduit, the Bourdon tube comprising a tube formed of elastic material and of non-circular cross-section; there being provided pressure means for exerting pressure to a surface of the Bourdon tube in the span of the enclosure means set forth below, and operative to cause a deflection of wall portions of the Bourdon tube in said span, and there also being enclosure means enclosing portions of the Bourdon tube but permitting pressure from the pressure means to be operatively exerted to the said surface of the Bourdon tube, and blocking means are also provided which extend between the Bourdon tube and the enclosure means and prevent pressure exerted by the pressure means to be exerted against more than a selected portion or portions of the Bourdon tube;

the method comprising the steps of (a) causing carrier liquid to be present at an outlet of the conduit; (b) relieving force to one of the portions of the Bourdon tube thereby causing pressure upstream of the outlet to be less than externally of the outlet, and thus causing the outer end portion of the carrier liquid to be withdrawn a small amount into the outlet; (c) dipping the outlet into a source of a second liquid to be metered and dispensed; (d) relieving force to another one or more portions of the Bourdon tube thereby causing pressure upstream of the outlet to be less than that of the second liquid in the region of the outlet while the latter is immersed in the source of the second liquid, and thus causing a metered amount of the second liquid to be drawn into the outlet but with a bubble of air existing between the adjacent portions of the carrier liquid and the second liquid; (e) withdrawing the outlet from the source of second liquid; and (f) applying force to the Bourdon tube thereby causing pressure in the outlet to be greater than externally of the outlet, and thus causing the metered amount of second liquid to be dispensed from the outlet.

8. A precision fluid metering device, comprising, in combination:
   a Bourdon tube means, comprising a tube formed of elastic material and of non-circular cross-section;
   pressure means for exerting pressure to the interior surface of the Bourdon tube means in the span of the enclosure means set forth below, and operative to cause an expansion or outward deflection of wall portions of the Bourdon tube means in said span;
   enclosure means enclosing portions of the Bourdon tube means but permitting pressure from the pressure means to be operatively exerted internally of the Bourdon tube means; and control means by which actuation of the pressure means exerts pressure to the interior surface of the Bourdon tube means to effect an expansion or outward deflection of the Bourdon tube walls and thus also effect a change of volume of the Bourdon tube which causes an increment of fluid to be displaced in the region between the Bourdon tube means and the enclosure;

in a combination in which blocking means are provided which extend between the Bourdon tube means and the enclosure means and prevent displacement of fluid from the region between the Bourdon tube means and enclosure except at a desired portion or portions of the Bourdon tube means span, thus providing a selective use of the displacement of fluid in one or more of the various portions of the Bourdon tube means span, and in which the control means is operative, optionally at the will of the user, to operatively interconnect a selected one or ones of the portions of the Bourdon tube means span and thereby achieve a selected variation in the amount of fluid displaced, the variation of fluid volume displaced being dependent upon which one or more portions of the Bourdon tube means are operatively interconnected.

9. The invention as set forth in claim 8 in a combination in which the support means are provided at varying spacings along the Bourdon tube means, thereby achieving a variation in the amount of fluid displaced depending upon which one or more portions of the Bourdon tube means are operatively interconnected.

10. A precision fluid metering device, comprising, in combination:

a Bourdon tube means, comprising a tube formed of elastic material and of non-circular cross-section, portions thereof having a different radius of curvature in comparison to that of other portions thereof;

pressure means for exerting pressure to the exterior surface of the Bourdon tube means in the span of the enclosure means set forth below, and operative to cause a flattening or inward deflection of wall portions having the relatively greater radius of curvature, of the Bourdon tube means in said span;

enclosure means enclosing portions of the Bourdon tube means but permitting pressure from the pressure means to be operatively exerted exteriorly to the Bourdon tube means; and control means by which actuation of the pressure means exerts pressure to the exterior surface of the Bourdon tube means to effect the said flattening or inward deflection of the said greater radius of curvature Bourdon tube walls and thus also effect a change of volume of the Bourdon tube interior which causes an increment of fluid to be displaced, the change of volume corresponding to the pressure differential caused by the said pressure means as controlled by the said control means;

the Bourdon tube means being of repetitively constant spring properties in its inward deflection and subsequent outward movement of its wall portions, achieving thereby a repetitively attainable precision of metering of even very small and microliter batch amounts of the fluid being metered as the control means actuates the Bourdon tube means in its said metering operativity by volume changes of the interior of the Bourdon tube means solely by pressure differential existing interiorly as contrasted to exteriorly of the wall portions of the Bourdon tube means.

11. A precision fluid metering device, comprising, in combination:

a Bourdon tube means, comprising a tube formed of elastic material and of non-circular cross-section, portions thereof having a different radius of curvature in comparison to that of other portions thereof;

pressure means for exerting pressure to the interior surface of the Bourdon tube means in the span of the enclosure means set forth below, and operatively to cause an expansion or outward deflection of wall portions having the relatively greater radius of curvature, of the Bourdon tube means in said span;

enclosure means enclosing portions of the Bourdon tube means but permitting pressure from the pressure means to be operatively exerted internally of the Bourdon tube means; and control means by which actuation of the pressure means exerts pressure to the interior surface of the Bourdon tube means to effect the said expansion or outward deflection of the said greater radius of curvature Bourdon tube walls and thus also effect a change of volume of the Bourdon tube which causes an increment of fluid to be displaced in the region between the Bourdon tube means and the enclosure, the change of volume corresponding to the pressure differential caused by the said pressure means as controlled by the said control means;

the Bourdon tube means being of repetitively constant spring properties in its outward deflection and subsequent inward movement of its wall portions, achieving thereby a repetitively attainable precision of metering of even very small and microliter batch amounts of the fluid being metered as the control means actuates the Bourdon tube means in its said metering operativity by volume changes of the Bourdon tube means solely by pressure differential existing interiorly as contrasted to exteriorly of the wall portions of the Bourdon tube means.

* * * * *

UNITED STATES PATENT AND TRADEMARK OFFICE
CERTIFICATE OF CORRECTION

PATENT NO. : 4,484,698
DATED : 11/27/84
INVENTOR(S) : Maurice Starr

It is certified that error appears in the above—identified patent and that said Letters Patent is hereby corrected as shown below:

Column 9, line 16, being the 29th line of Claim 1:
    The word "bourdon" should read: -- Bourdon -- .

Column 12, line 26, being Claim 11, line 11:
    The word-portion "tively" should be: -- tive -- .

Signed and Sealed this

Twenty-third Day of April 1985

[SEAL]

Attest:

DONALD J. QUIGG

Attesting Officer     Acting Commissioner of Patents and Trademarks